May 23, 1939.  E. E. NEWTON ET AL  2,159,222
APPARATUS FOR COATING STRANDS
Original Filed Dec. 22, 1932  6 Sheets-Sheet 6

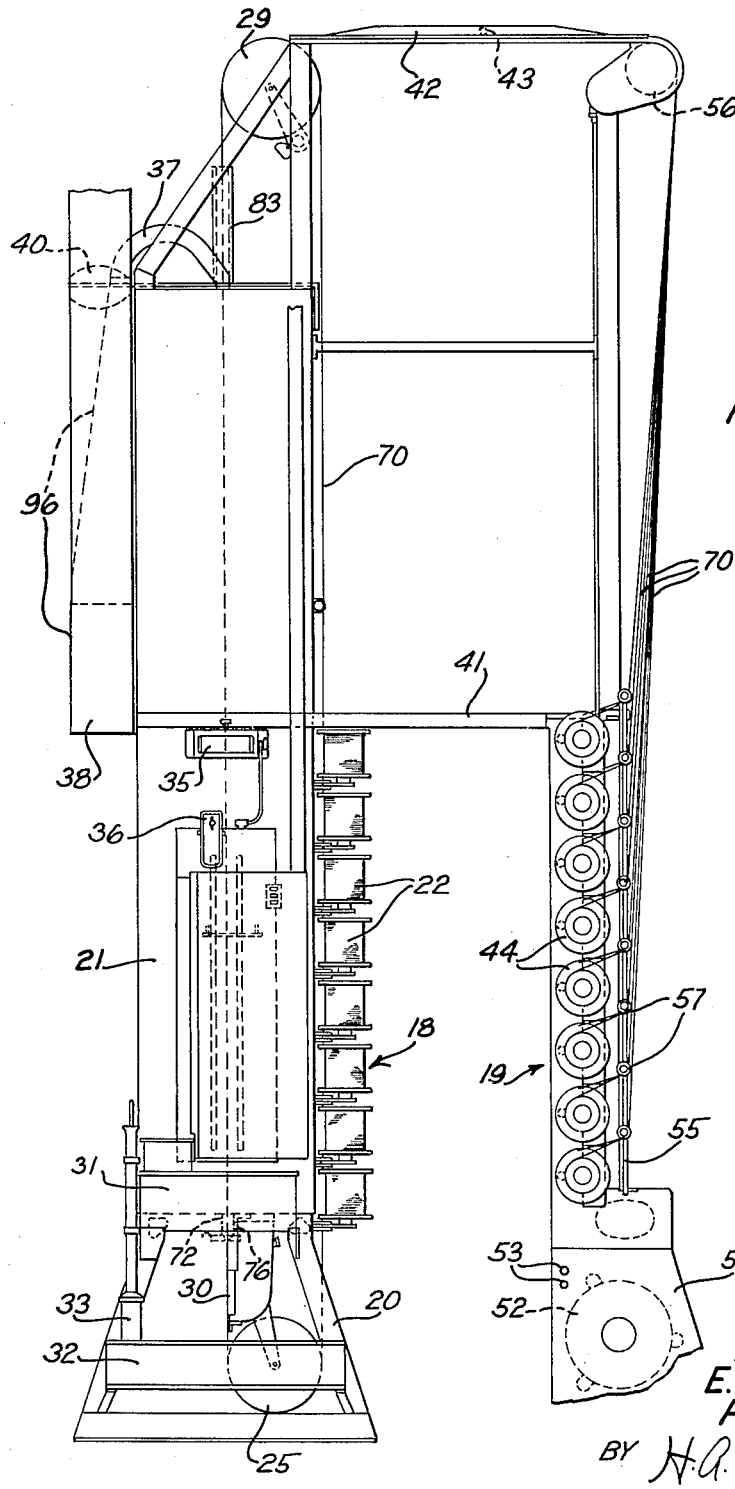

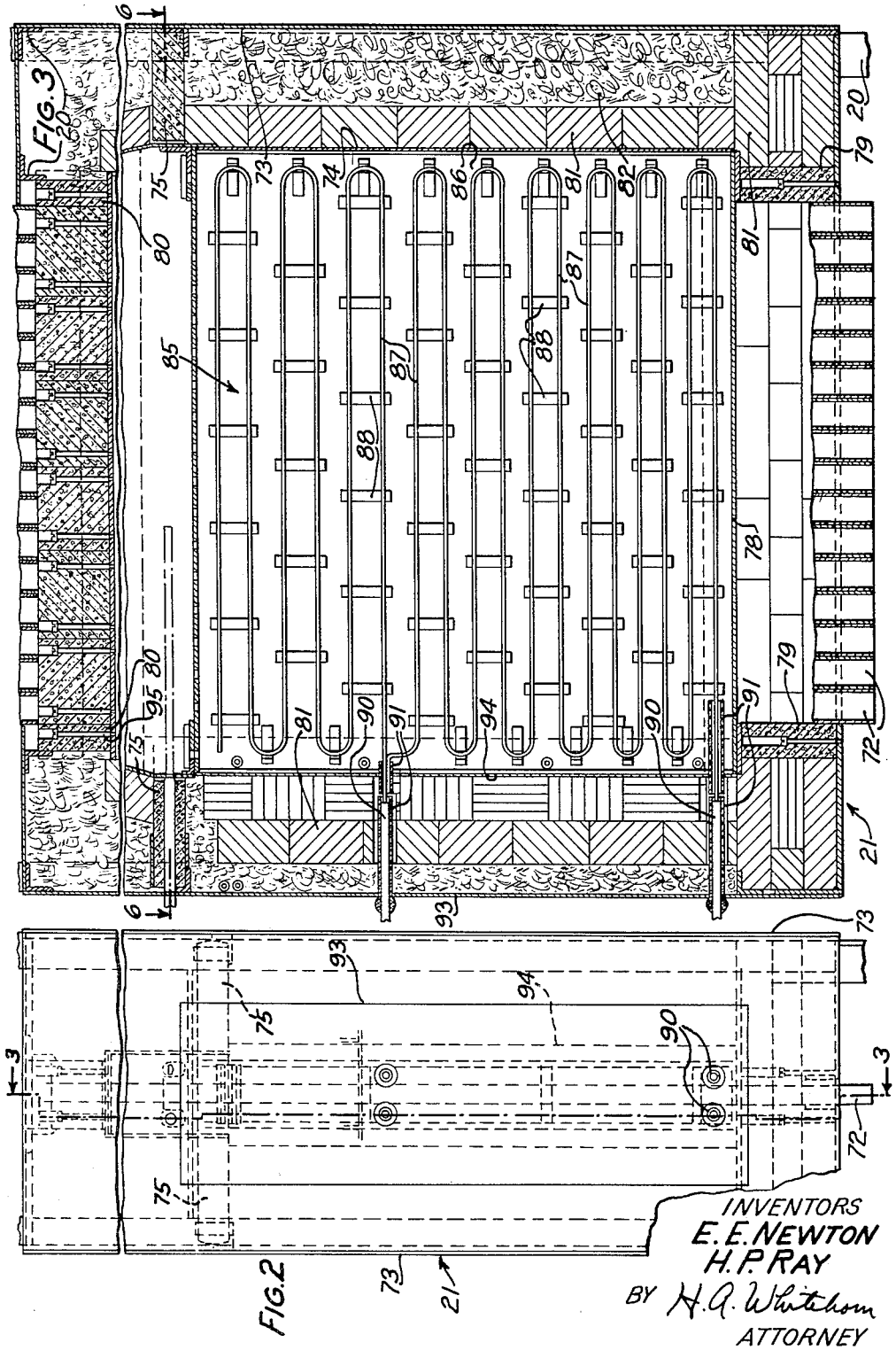

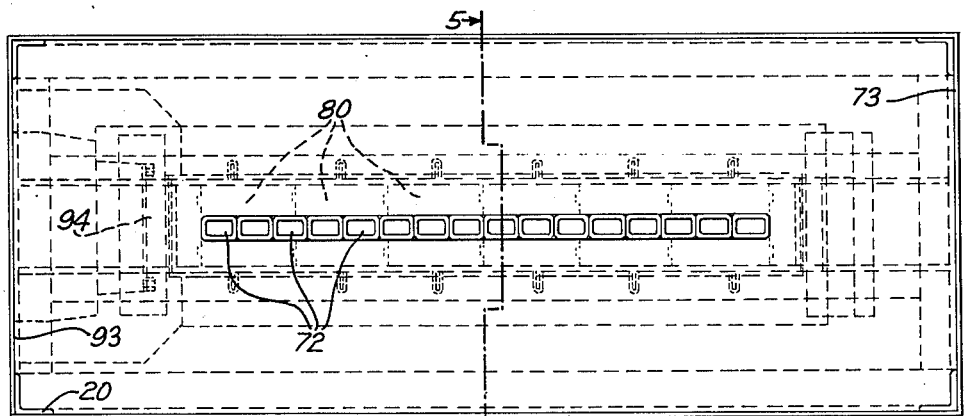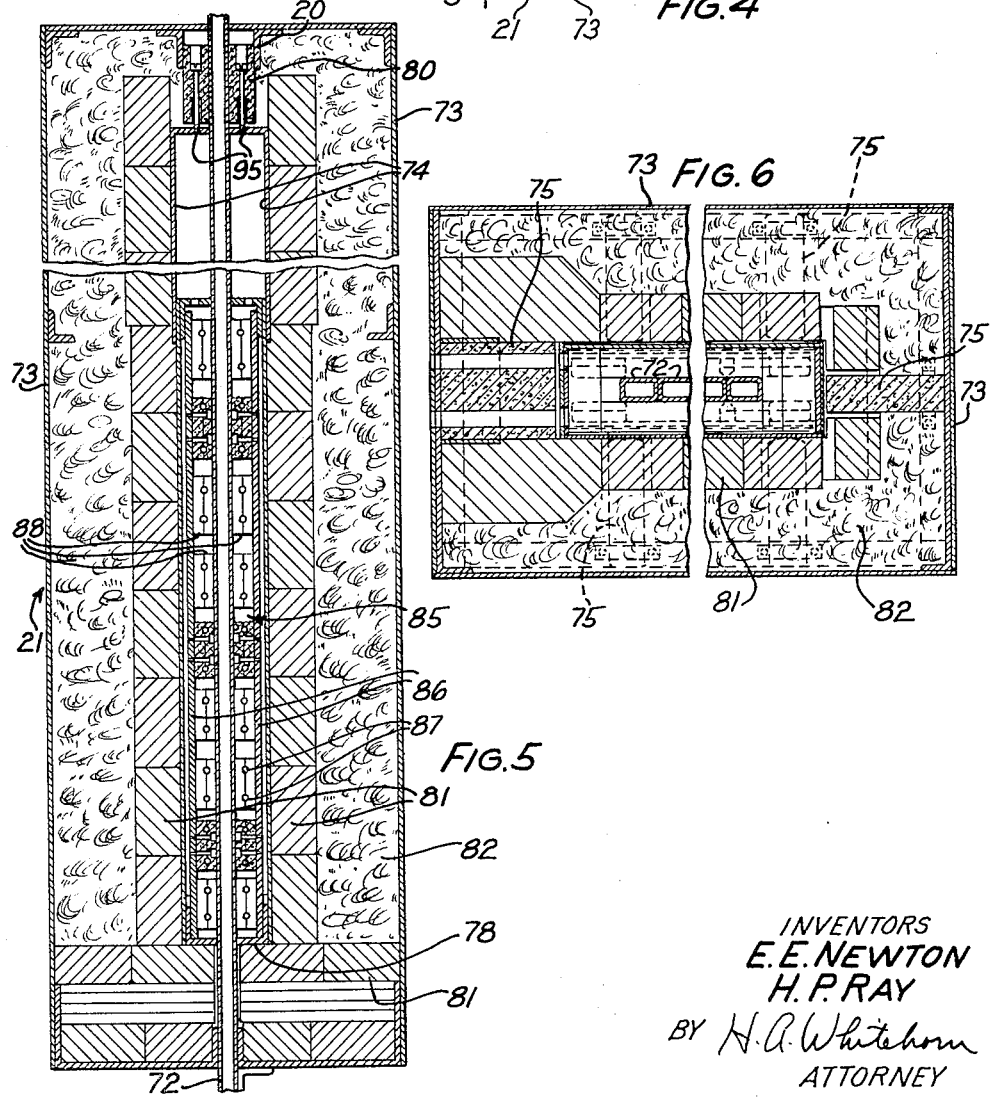

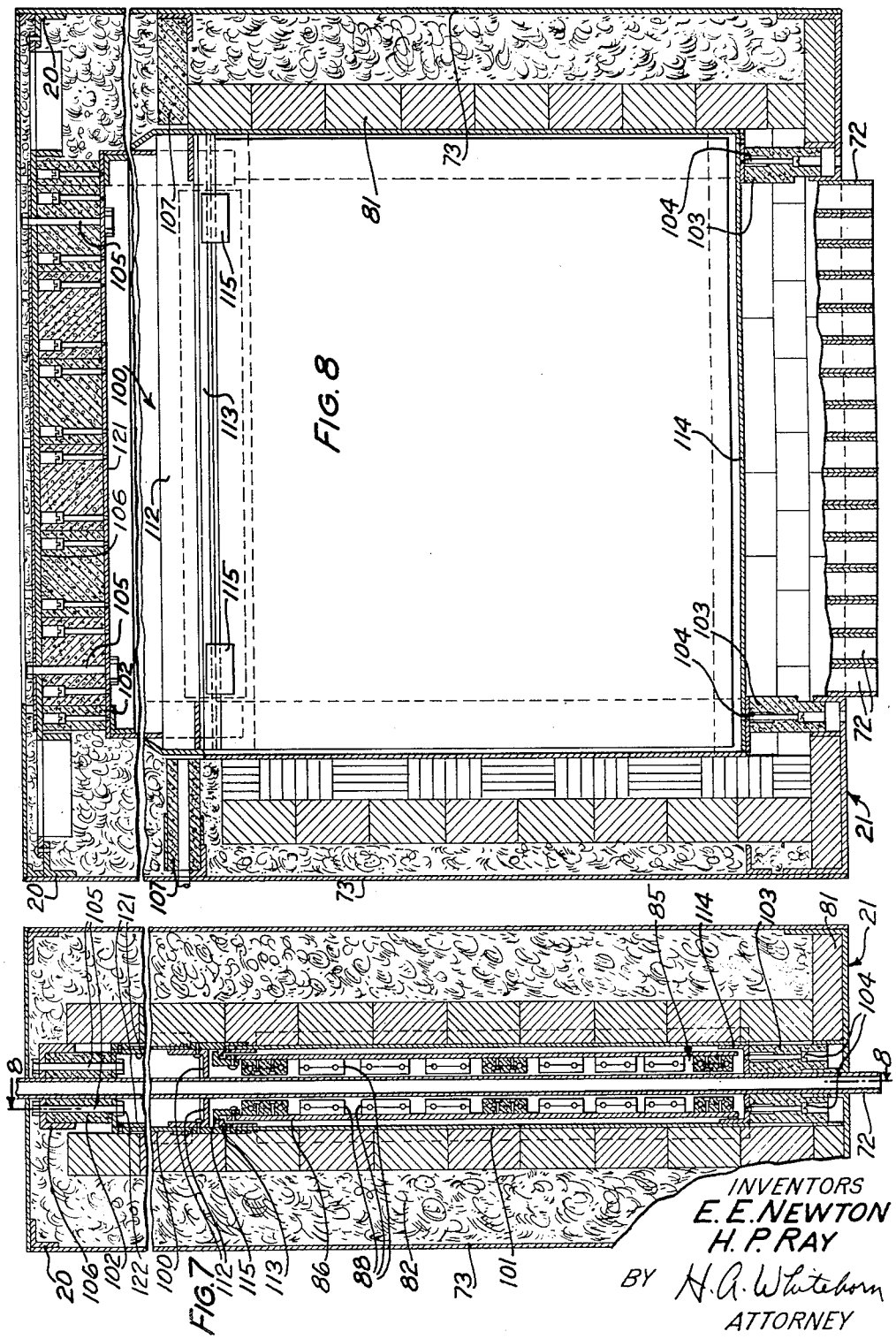

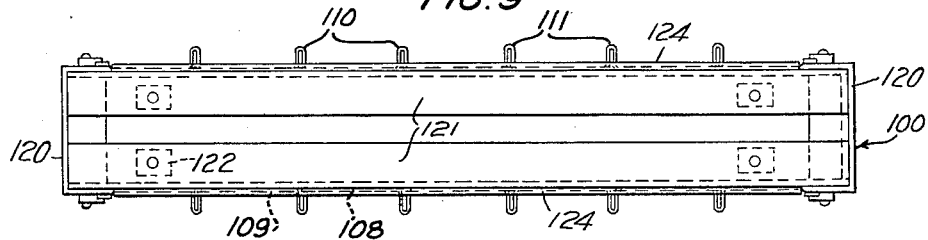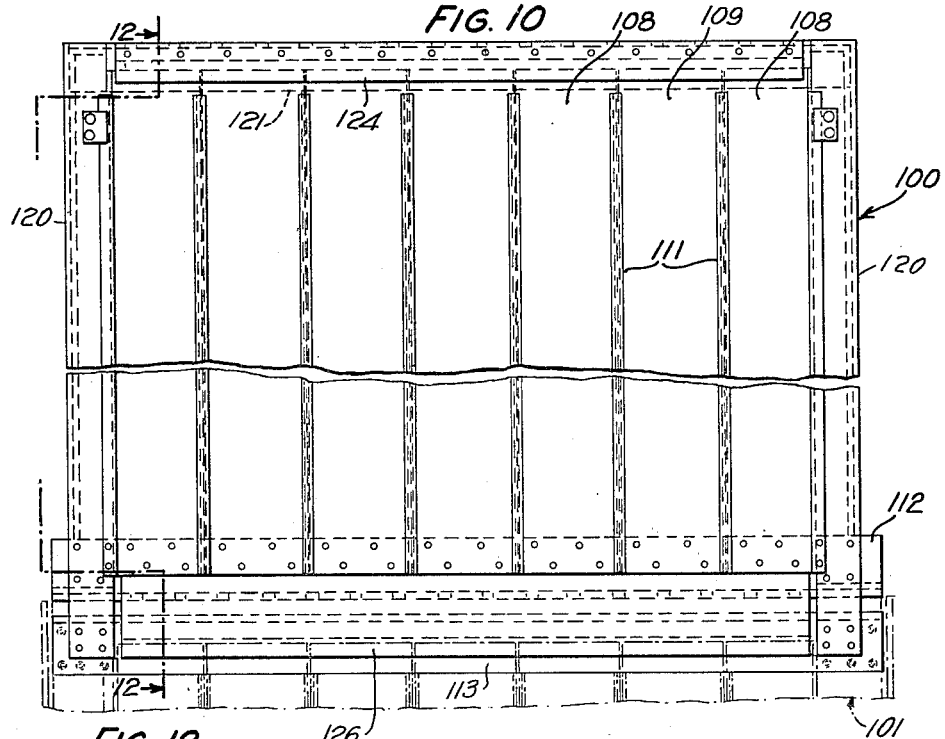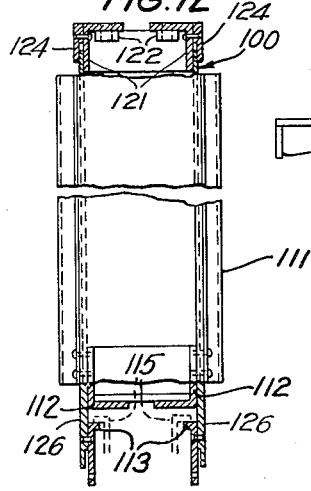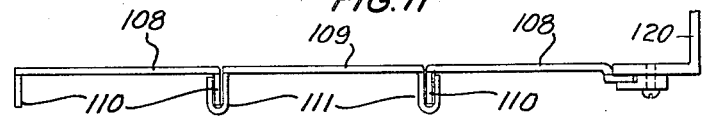

INVENTORS
E. E. NEWTON
H. P. RAY
BY H. A. Whitehorn
ATTORNEY

Patented May 23, 1939

2,159,222

UNITED STATES PATENT OFFICE 2,159,222

APPARATUS FOR COATING STRANDS

Edwin E. Newton, Montreal, Quebec, and Hugh P. Ray, Mount Royal, Quebec, Canada, assignors to Western Electric Company, Incorporated, New York, N. Y., a corporation of New York Original application December 22, 1932, Serial No. 648,414, now Patent No. 2,032,950, dated March 3, 1936. Divided and this application January 14, 1936, Serial No. 59,063

2 Claims. (Cl. 34—48)

This invention relates to apparatus for coating strands, and more particularly to an apparatus for applying an insulating enamel coating to electrical conductors in wire form, and this application is a division of our copending application, Serial No. 648,414, filed December 22, 1932.

The invention is particularly applicable to an apparatus wherein wire is drawn from a supply spool, an enameling compound is applied a plurality of times and the wire is drawn through a baking oven a corresponding number of times to harden the enamel coatings, after which the enameled wire passes over a capstan which draws it at the desired speed through the apparatus and from which it passes to a take-up spool.

Objects of the invention are to provide an improved apparatus for uniformly coating the strands rapidly and efficiently with a minimum amount of manual labor.

In accordance with a preferred embodiment of the invention, the enamel coatings are applied to the wires by drawing the wires across the face of a pad saturated with enameling compound. Wires to be enameled are supplied to the apparatus from a plurality of supply spools from which they pass around lower rotatable multiple grooved pulleys, across the face of a pad saturated with an enameling compound, through a baking oven where the coatings of enamel are baked on the wire, around upper rotatable multiple grooved pulleys, and over a capstan to a plurality of take-up spools, upon which they are wound. Each of the wires passes rapidly a number of times through vertically extending tubes in the oven, the tubes being located between electrical heating elements of special construction which maintain a very high temperature within the tubes. Special heat insulating means to prevent heat losses are provided and the oven is constructed to allow for the expansion and contraction of the parts thereof while it is being heated and cooled.

Other objects and advantages of the invention will more fully appear from the following detailed description and accompanying drawings, in which:

Fig. 1 is a side elevation of a strand coating apparatus embodying the invention;

Fig. 2 is a side elevational view of the oven;

Fig. 3 is a sectional elevation of the oven taken on the line 3—3 of Fig. 2;

Fig. 4 is a plan view of the oven;

Fig. 5 is a sectional elevation of the oven taken on the line 5—5 of Fig. 4;

Fig. 6 is a sectional plan view of the oven taken on the line 6—6 of Fig. 3;

Fig. 7 is a sectional elevation of another embodiment of an oven through one of the tubes;

Fig. 8 is a sectional elevation of the oven taken along the line 8—8 of Fig. 7;

Fig. 9 is a plan view of the inner walls of the upper portion of the oven shown in Fig. 7;

Fig. 10 is an elevational view of one of the inner side walls of the upper portion of the oven shown in Fig. 7;

Fig. 11 is an enlarged detailed view of the plates shown in Fig. 10 which make up the inner walls of the oven;

Fig. 12 is an end view partially in section taken along the line 12—12 of Fig. 10;

Figure 13:
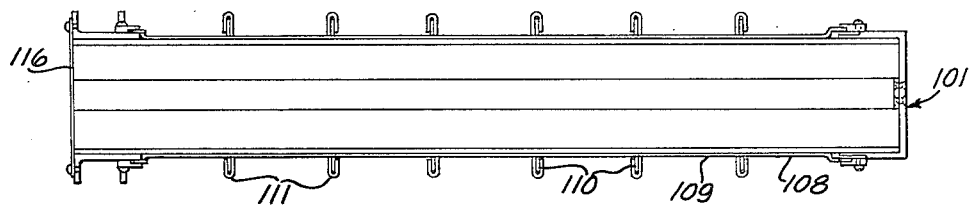
Fig. 13 is a plan view of the inner walls of the lower section of the oven shown in Fig. 7.

Referring to the drawings, there is shown in Fig. 1 a wire enameling apparatus which comprises, in general, an enamel coating unit 18 and a wire take-up unit 19.

The enamel coating unit 18 comprises a framework designated generally at 20 which supports an oven 21, a plurality of supply spools 22, an equal number of independently rotatable multiple grooved pulleys 25 below the oven 21, an equal number of independently rotatable multiple grooved pulleys 29 above the oven, an enamel applicator pad designated generally at 30, an enameling compound supply tank 31, an enameling compound drainage tank 32, an enameling compound pump 33, a temperature indicating device 35, a temperature control device 36, an exhaust hood 37, an exhaust condenser 38, and an exhaust damper 40.

The supply spools are mounted in two columns on the framework 20 at the inner end of the enamel coating unit on one side of the oven 21 so that the axes of the spools in each column are in a common vertical plane.

The take-up unit 19 is fully described and claimed in our copending application, Serial No. 59,062, filed January 14, 1936. It is believed sufficient to state herein that this unit comprises a box shaped base 50 which houses a motor (not shown), motor speed control means comprising a rheostat 52 and motor switching means 53, a traverse frame 55 having a plurality of traverse guide pulleys 57 therein, an equal number of frictionally driven take-up spools 44 and a capstan 56. The traverse frame 55 comprises a lower horizontal member, an upper horizontal member and substantially vertical side members connecting the horizontal members, the guide pulleys 57 being secured to the side members. The capstan 56 comprises a steel cylinder of large diameter with a thick soft rubber cover which provides sufficient friction to prevent slipping of the wires 70 by merely passing them over the top. Frame 20 and box shaped base 50 mutually support and are connected by a platform 41 and a pair of braces 42. A mandrel 43 supported by the pair of braces 42 has a plurality of peripheral grooves equal in number to the number of pulleys 29 and is adapted to form a member to which loose ends of wire may be attached when threading the wires 70 through the machine or when one of the wires breaks during the operation of the machine.

The framework 20 supports the oven 21 which is provided with apertures at the top and bottom through which rectangular tubes 72 (Figs. 2, 3, 4, 5 and 6) formed from round heavy nickel tubes, extend. The oven 21 comprises outer walls 73 and inner walls 74 spaced from each other by insulating spacing blocks 75 of Lavite. At the bottom of the oven the rectangular tubes 72 are fixed to the framework 20 and, to allow for expansion and contraction, the tubes 72 are otherwise slidably mounted. Inserted in slots at the bottom of each tube 72 are a pair of slidable dampers 76 to limit the amount of air ascending in the tube 72 and to permit adjusting the opening as required. The inner walls 74 are supported by a slotted plate 78 (Figs. 3 and 5) which rest upon heat insulating supporting blocks 79 of Lavite. Expansion of the inner walls 74 is provided for at the top of the oven 21 by heat insulating sliding blocks 80 of Lavite which surround the tubes 72 and are slidably mounted in the framework 20. Between the inner walls 74 and the outer walls 73 heat insulating material is provided. The heat insulating brickwork 81 is positioned against the inner walls 74 and heat insulating material such as rockwool 82 is positioned between the insulating brickwork 81 and the outer walls 73.

To facilitate the rapid cooling of the wires 70 after they leave the oven 21 and before they reach the upper pulley 29, it was found desirable, especially in the case of wires of large diameter, to provide auxiliary cooling means. A plurality of tube-like members 83 of the same internal dimensions as the tubes 72 with their lower ends connected to the exhaust hood 37, to provide a downdraft through the tube-like members 83, were found satisfactory for this purpose.

A heating unit 85 is positioned at the lower portion of the oven. The heating unit 85 comprises two heavy nickel plates 86 (Figs. 3 and 5), one in front of and one in back of the rectangular tubes 72. Suitable resistance wires 87 are mounted on the plates 86 and are insulated therefrom and from the tubes 72 by means of insulators 88 of Lavite, which insulators are mounted on the plates 86. The ends of the resistance wires 87 are welded to low resistance copper terminal rods 90 to which the electrical connections from the source of supply are made. Porcelain insulators 91 insulate the resistance wires 87 and terminal rods 90 from the inner and outer walls of the oven and from the heat insulating materials. The heating units 85 and oven 21 are designed to produce a temperature of approximately 1300° Fahrenheit within the tubes 72 approximately midway between the top and bottom of the tube. The tubes 72 and plates 86 are made of pure nickel which will not flake at the temperatures employed. To permit the making of repairs on the heating unit, the side of the oven 21 from which the heating unit terminals 90 protrude is provided with removable outer wall plates 93 and removable inner wall plates 94. Blocks 79 and 80 are held in place by means of screws 95 seated in recesses formed in the blocks and threaded into the walls of the oven, the recesses forming heat insulating dead air spaces.

In a particular embodiment constructed and found satisfactory, each of the sixteen rectangular nickel tubes 72 were approximately 100 inches long, with an opening approximately 1⅝ inches by ⅞ inch therein, and a wall thickness of approximately .125 inch. The nickel plates 86 of the heating unit 85 were approximately .312 inch thick.

With an oven constructed as described above and a temperature of approximately 1300° Fahrenheit in the tubes midway between the ends thereof, and the use of a relatively thick enamel applied by means of the felt applicator pad 30, it has been found possible to run No. 33 gauge wire through the apparatus at approximately 135 feet per minute, which speed is approximately three times that formerly found practicable.

The solvents in the enameling compound which are driven off the coated wires 70 by the heat in the tubes 72 are drawn from the tops of the rectangular tubes 72 into the exhaust hood 37 which is connected through the exhaust condenser 38 to an exhaust system equipped with a suction fan (not shown). The exhaust condenser 38 is provided with removable plates 96 (Fig. 1) to facilitate removing the condensate as required. The exhaust damper 40 is employed to regulate the pressure difference between the atmosphere and the gases in the exhaust condenser 38.

The machine as disclosed is capable of simultaneously enameling sixteen individual strands of wire 70. In the operation of the machine each of the wires 70 to be coated is fed from a supply spool 22 and passes around the multiple grooved pulley 25, upward in contact with the saturated face of the pad 30 (to receive the first coat of enamel), through the tube 72 (where the enamel coating just applied is thoroughly baked onto the wire), around the pulley 29, from which the wire 70 passes several more times around the pulleys 25 and 29, contacts with the pad 30 and passes through the tube 72 of the oven 21.

After the last pass of the wire 70 passes through the tube 72, the wire 70 passes over the pulley 29 and in an approximately horizontal direction, under the mandrel 43 to the rubber covered capstan 56, over the capstan 56 and downward over a guide pulley 57 to a take-up spool 44.

The draft within the individual tubes 72 of the oven 21 is controlled by adjusting the sliding dampers 76 and the exhaust damper 40. The oven 21 is heated and its temperature adjusted by the temperature control device 36. The motor is started by operation of the starting button 53 and its speed adjusted by the control rheostat 52. The motor drives the capstan 56 and oscillates the traverse frame 55 causing the wires 70 to be drawn through the apparatus.

Another preferred embodiment of the construction of the oven 21 which is supported by the framework 20 is shown in Figs. 7 to 15, inclusive. The oven is provided with apertures at the top and bottom through which the rectangular nickel tubes 72 (Fig. 7) extend. The inner walls are made in two sections, an upper section 100 and a lower section 101. All the parts of the upper and lower inner wall sections, including the screws and rivets used, are of nickel.

The upper inner wall section 100 is suspended from the upper portion of the outer wall 73 by bolts 105 which pass through horizontal supporting members 106 and Lavite insulating blocks 102. As shown in Fig. 8, the supporting members 106 are secured at their ends to the angle members 20 of the framework to which the outer wall 73 is attached. The construction of the upper section of the inner wall is shown in Figs. 9, 10, 11 and 12. The front and rear wall portions of the upper section 100 are made up of a number of heavy nickel plates 108 and 109. The plates 108 have flanges 110 projecting therefrom, and the plates 109 have U-shaped end projections 111 which are slidably fitted over the flanges 110 so that the individual plates can expand and contract lengthwise with respect to each other. The bottoms of the plates 108 and 109 are secured to members 112 and the tops of these plates are left free so that they can expand and contract without creating any undesirable stresses in the apparatus as it heats and cools. The members 112 are secured at their ends to vertical channel members 120, 120 (Figs. 9 and 10) which are interconnected at their upper ends by horizontal angle members 121, 121. The bolts 105 pass through apertures in the horizontal flanges of the angle members 121 and are threaded into nuts 122 fastened to the underside of said flanges. Thus, the entire upper section 100, including the sectional wall portions 108 and 109, is suspended from the supporting members 106 which are secured to the frame members 20 to which the outer wall 73 is attached.

As stated above, the upper portions of the plates 108 and 109 are free to expand and contract lengthwise with respect to each other. The upper ends of these plates are slidably fitted between the angle members 121 and undercut retaining plates 124, 124, the latter being secured to the angle members, as shown in Fig. 12.

Figure 14:
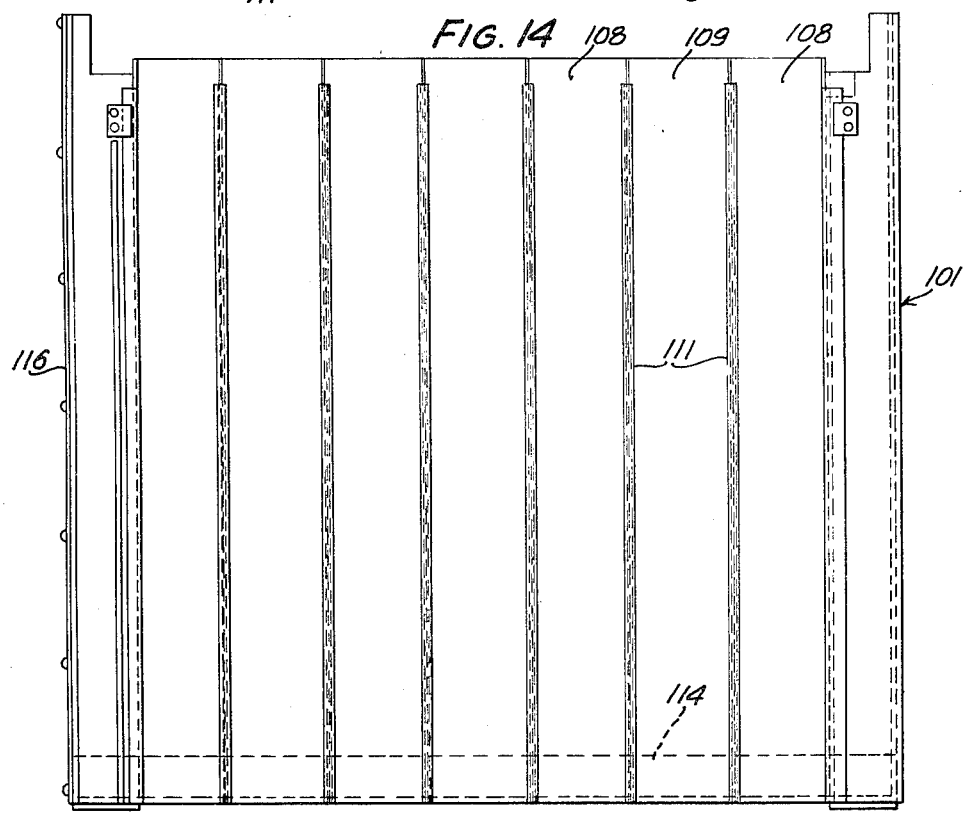
Fig. 14 is an elevational view of the side of the lower section of the inner walls shown in Fig. 7.
Figure 15:
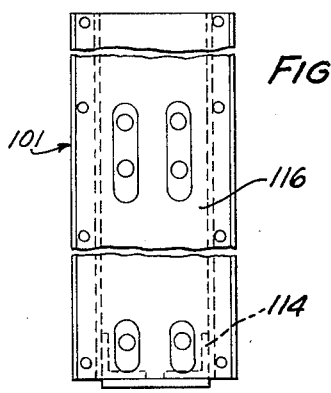
Fig. 15 is an elevational view of one end of the lower section of inner walls shown in Fig. 7.

The lower inner wall section 101, the construction of which is shown in Figs. 13, 14 and 15 is of the same height as the heating units 85. It comprises alternate plates 108 having flanges 110 and plates 109 having U-shaped sections 111. The plates are assembled in a manner similar to the plates in the upper inner wall section, the bottoms of these plates being secured to angle members 114 and the top portions thereof being slidable between the members 113 and undercut retaining plates 126 attached to members 113. The lower inner wall section 101 is suspended from upper inner wall section 100 by securing the ends of the two sections together, as shown in dotted lines in Fig. 10. A removable door 116 on the lower inner wall section 101 permits the rapid removal of the heating units 85 for inspection and repair. The heating units 85 are suspended from the upper section 100 by means of angle members 115 secured to the heating units 85 and members 113 secured to the upper section 100. The heating units 85 are readily assembled between the lower inner wall plates 108 and 109 and the tubes 72 by sliding them into place. Sliding blocks 103 are secured to the angle plate 114 at the bottom of the lower inner wall section 101 by means of screws 104. The lower end of the outer walls 73 are arranged to permit the blocks 103 to readily slide up and down as the various parts of the oven expand and contract.

While the invention has been described with special reference to the embodiment illustrated herein, it is to be understood that various modifications may be made therein without departing from the spirit of applicants' invention, the scope of which is defined by the appended claims.

What is claimed is:

1. In a wire coating apparatus, an upright heating chamber comprising a vertical outer wall, an inner wall supporting frame suspended from said outer wall, and a vertical inner wall section having its lower end attached to said supporting frame and its upper end freely movable to permit expansion thereof in response to temperature variations within said chamber, and means for passing a coated wire to be treated through said chamber.

2. In a wire coating apparatus, an upright heating chamber comprising a vertical outer wall, an inner wall supporting frame suspended from said outer wall, and a vertical inner wall section comprising a series of vertical plates having their lower ends attached to said supporting frame and their upper ends freely movable to permit individual expansion thereof in response to temperature variations within said chamber, a plurality of tubes mounted within said chamber, and means for passing a coated wire to be treated through each of said tubes.

EDWIN E. NEWTON.
HUGH P. RAY.